May 24, 1927.

G. RUSSO 1,629,974

OPTICAL APPARATUS, AS PHOTOGRAPHIC CAMERA FOR REPRODUCING
THE OBJECTS WITH THEIR NATURAL COLORS

Filed Oct. 26, 1921      3 Sheets-Sheet 1

Inventor
G. Russo,
By Marks&Clerk
Attys.

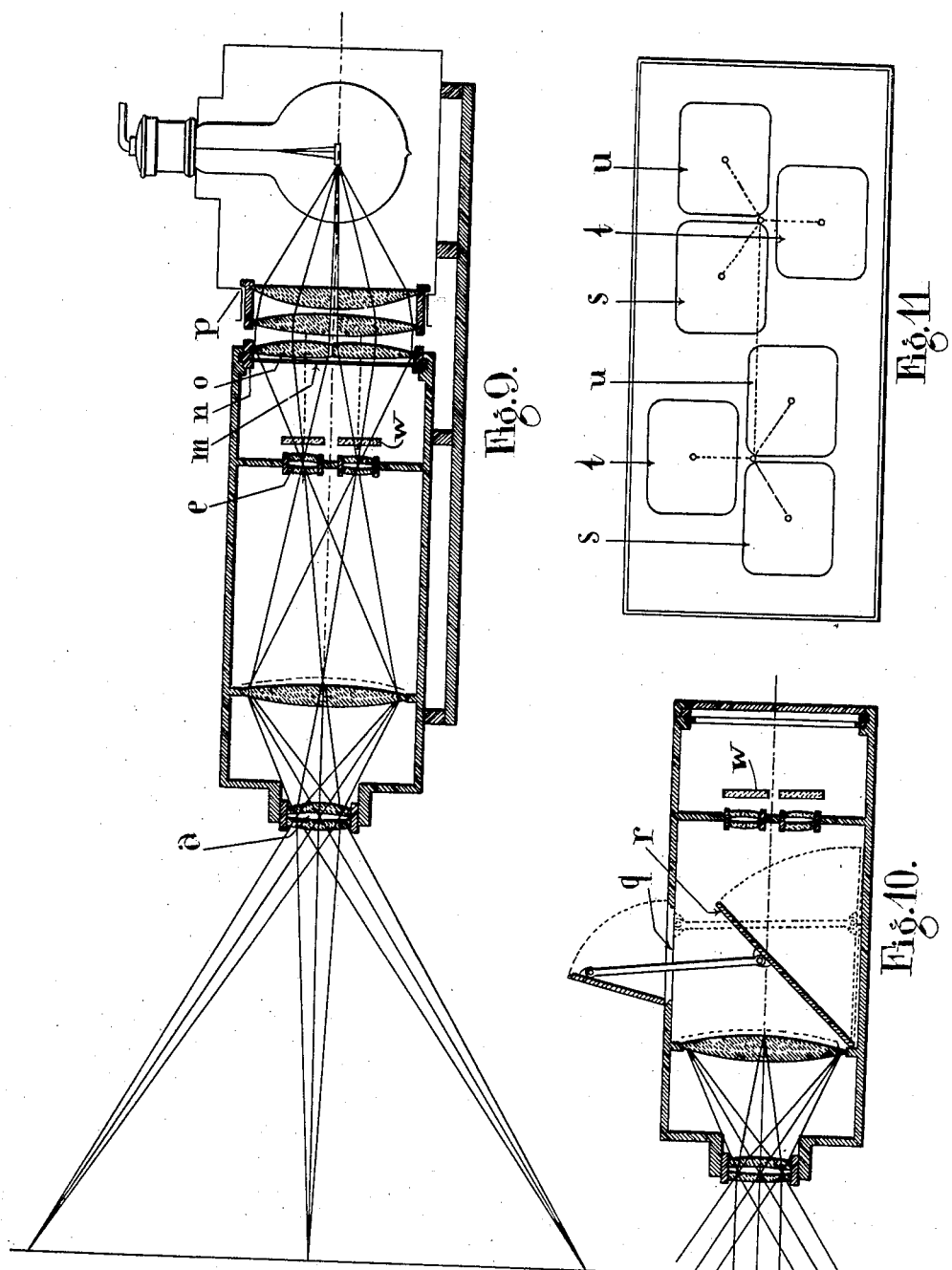

Patented May 24, 1927.

1,629,974

UNITED STATES PATENT OFFICE.

GIOACCHINO RUSSO, OF CATANIA, ITALY.

OPTICAL APPARATUS, AS PHOTOGRAPHIC CAMERA, FOR REPRODUCING THE OBJECTS WITH THEIR NATURAL COLORS.

Application filed October 26, 1921, Serial No. 510,668, and in Italy February 24, 1921.

This invention relates to optical instruments and has for object an improvement in either photographic, stereoscopic and cinematographic cameras, by means of which improvement the objects are reproduced with their natural colors.

In this invention there is applied the principles known in the art of photography, including those relative to the use of photographic plates which are made sensitive to every color by means of chemicals and advantage is taken of the well known principle of the decomposition of white light or of any gradation of colored light into elementary colored lights, and of the reconstitution of white light or of any gradation of colored light by means of the combination of the corresponding elementary colored lights, which principles I need not mention.

A peculiarity and novelty in my invention is that by means of an optical arrangement placed between the object glass and the sensitive plate, the image produced by the object glass is decomposed into a plurality of images each one corresponding to one of the elementary colors of the real object, such images being grouped on a single plate, that is on the plane of the sensitive plate or film, and photographed all together and at the same time on the said plate or film, which latter must be made sensitive to every color for this purpose, i. e., must be panchromatic.

In certain ways the invention is connected with the method followed in the graphic art for producing what are called the trichromatism, but it is quite new in that there is a single object glass through which the rays of light enter the camera and a single plate on which such rays form three or more images. Besides, the method is new in that the same photographic machine or camera by means of which the views are taken and fixed on the plate may be used both as a projecting and a direct view finding apparatus, the object glass becoming in the latter instance the eye glass.

In order that the invention may be better understood reference will now be made to the accompanying drawings, in which:

Figure 9 represents an axial vertical section of the whole system arranged for the projection;

Figure 10 represents a contrivance for seeing and focussing the image to be photographed;

Figure 11 shows the disposition of images produced with a stereoscopic camera of my system.

Figure 1:
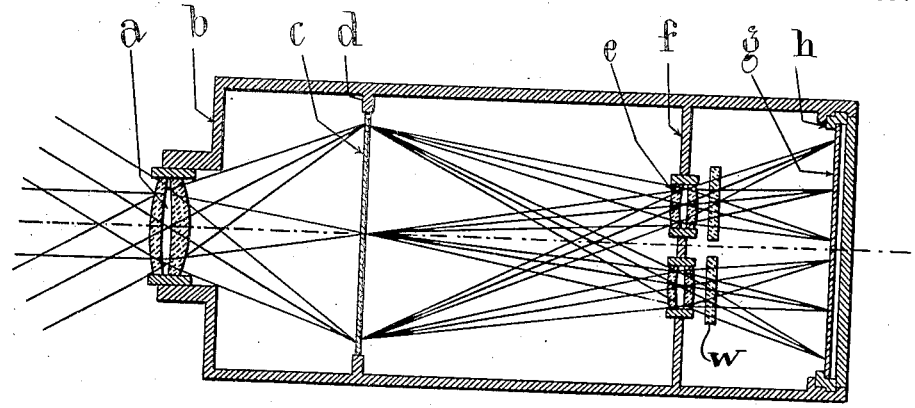
Figure 1 represents an axial vertical section of the apparatus in its original form, wherein a ground glass $c$ is one of the constituent parts.

The optical arrangement forming the object of the present invention is diagrammatically illustrated in Figure 1. In this figure, as well as in the other figures, $a$ represents the frontal or primary object glass of the achromatic type, having preferably a comparatively large diaphragm opening when compared with its focal distance; $b$ is the front wall of the camera, the object lens being movable in the wall, or the latter being itself movable together with the lens it carries, as is usual in ordinary photographic cameras; $c$ is a ground glass as used in cameras for focussing purposes; $d$ is an internal partition carrying the ground glass and limiting the size of the image to which it serves as a frame, and on which a passe partout or screen of black board having for instance a rectangular form with round angles as used for printing diapositives, can be applied; $e$ is a photographic object lens forming part of a group of similar lenses all arranged in one transverse plane placed behind the ground glass $c$. In Figure 1 only two of said object lenses are represented for sake of simplicity, but more than two such lenses are used in the reality, there may, in fact, be three or more and even seven, i. e., as many as the colors of the spectrum. All these lenses must be equal to one another in focal length. $f$ is an internal partition carrying lenses $e$, which are called secondary object lenses. Both partitions $d$ and $f$ are light-tight; $g$ is a sensitive photographic plate or film; $h$ a frame or slide carrying the plate being removable in order to allow to replace them at pleasure with a ground glass for the observation of the formed image.

In short, the camera forming the object of this invention substantially consists of a first portion $a$—$b$—$c$—$d$ similar to an ordinary photographic camera, and a second portion $e$—$f$—$g$—$h$ forming a second camera supplied with a plurality of object lenses and finally of an intermediate space $d$—$f$ serving to distance the camera $a$—$b$ from the camera $f$—$g$.

Each of the secondary lenses $e$ gives on the plane $g$ a secondary image of the primary one formed in the plane $c$, the distances $d$—$f$ and $f$—$g$ being fixed and so adjusted that the images formed in $g$ are exactly focussed. The distance and position of the secondary object lenses and the size of the primary image are so adjusted that the images formed at $g$ are sharp and separated from one another i. e., they do not superpose and are conveniently grouped and contained on the glass $g$.

The rays of light as indicated in Figure 1 show how the images are separated from one another. Figures 2, 3, 4, 5 diagrammatically illustrate some of the ways in which the images are grouped in the arrangements in which three, four and seven object lenses are used, these lenses being placed symmetrically with respect to the main axis.

It is to be noted here that while the primary image appears upside down on the plane $c$, the secondary ones appear in their upright position.

Before proceeding to state how the improved camera can give the images of the objects with their natural colors reference will be made to a modified form of said arrangement as substantially represented in Figures 6 and 7.

The ground glass $c$ mentioned with reference to the apparatus illustrated in Figure 1 and which is placed between the primary and the secondary object lenses $a$ and $e$ presents two drawbacks: firstly it absorbs a great part of the light diminishing the clearness of the images; secondly it fulfils but imperfectly its task of deviating the rays of light coming from the image formed by the object lens $a$ towards the lenses $e$ because the points of the primary image formed on the glass $c$ appear to the lenses $e$ less lighted the further they are from the line through the centre of the lens $a$ and the centres of said lenses $e$. It ensues that each of the secondary images on the plane $g$ has a maximum of intensity of light in a certain zone where the rays arrive more directly and a rapidly decreasing intensity outside said zone.

Figure 6:
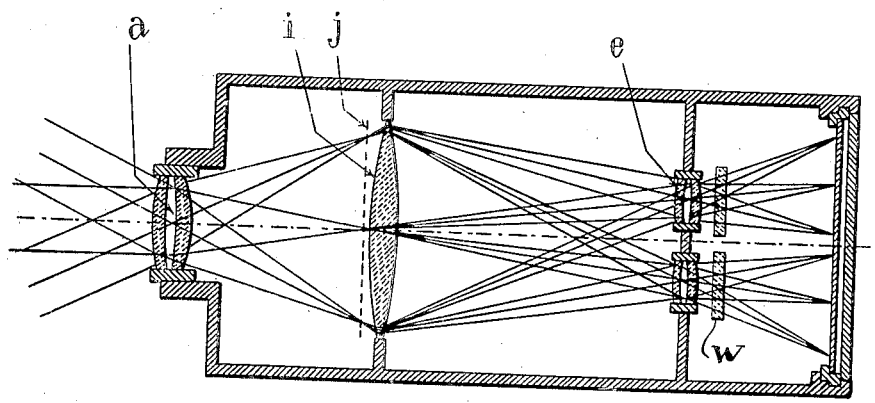
Figure 6 is a view similar to Fig. 1 with a convergent lens $i$ substituted for the ground glass $c$.

Both these inconveniences are eliminated by placing near the ground glass $c$, or even better, to dispense with the latter and substitute a converging lens $i$ as shown in Figure 6. This converging glass $i$ exactly fulfils the purpose of deviating the rays coming from the primary object lens $a$ and deflecting them towards the group of the secondary lenses $e$. The converging lens must be of such a diameter as to embrace the whole primary image formed on the plane $j$. Besides, this lens must have a degree of convergence (focal distance) that the rays deviated by it, converge towards the group of secondary object lenses. Practically this condition is fulfilled whenever the focal distance of the lens $i$ is such as to give nearly on the plane of the front face of the lenses $e$ the image of the diaphragm of the object lens $a$. When such condition is fulfilled, one may see on the plane $e$ a circle of light: and if the object lenses $e$ are comprised in such circle, they will take the light in full and the transmission of the primary image $j$ to the plane of the secondary images will be effected regularly and with a uniform clearness.

It is obvious that the circle of light above referred to must be large enough to contain the whole group of secondary object lenses; and it is for this reason that lens $a$ has a large diameter with comparison to its focal distance. For the same reason it is necessary that the secondary lenses be small enough and sufficiently near to one another. Instead of having a circular shape, the secondary lenses may have a polygonal outline in order to exactly contact with one another and better utilize the space of said circle of light.

The converging lens $i$ may advantageously be replaced by two or more lenses as used in condensers in projecting apparatus.

Figure 7:
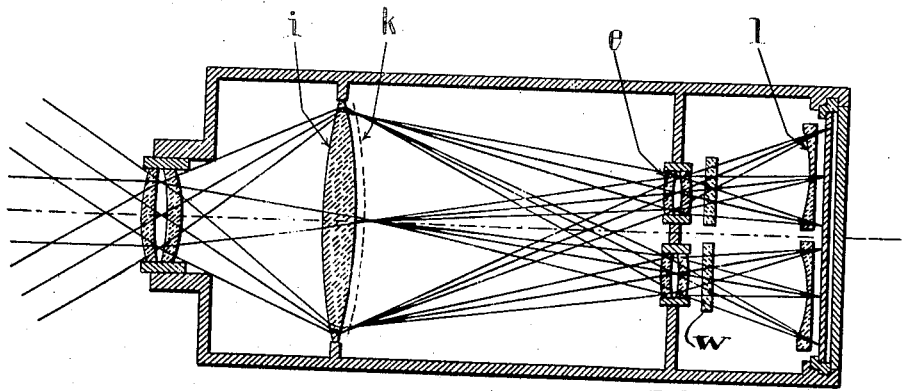
Figure 7 is a modification of the arrangement shown in Figure 6 and shows the same lens $i$ placed in a different position, and also shows the addition of plano-concave lenses $l$ before the plate or film.
Figure 2:
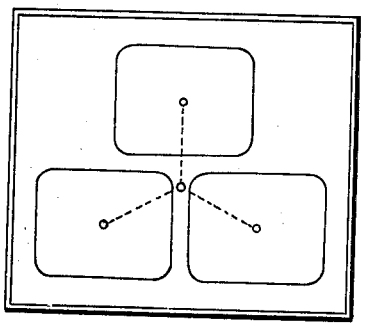
Figures 2, 3, 4, 5 represent some of the different arrangements of photographic images gathered on a plate or film.
Figure 3:
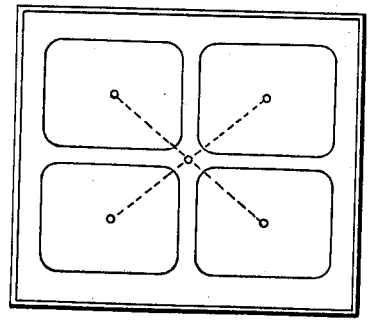
Figure 4:
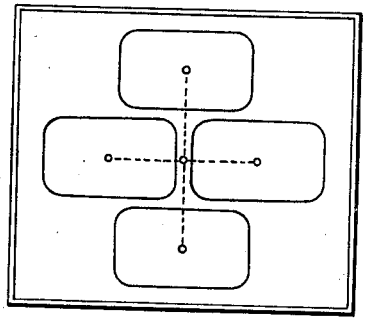

In Figure 6 the lens $i$ is seen to the right of the plane $j$ of the image given by lens $a$, but it may also be situated on the left hand as in Figure 7, that is, the lens $i$ may be situated before or behind the primary image. A middle solution could also be sought consisting in a central position of the lens $i$, so that the image should be formed in the centre of such lens, but this solution is not convenient unless the converging lens be made of two separate lenses, the image being then formed between them. In any case, the lens $i$ or the device constituting such lens must be placed near the place where the object lens forms the first image.

Unless the object lens $a$ is made with peculiar characteristics, it is impossible to avoid producing a bending of the image, and in Figure 7 the surface $h$ on which the image is formed is shown as somewhat curved, and even with the disposition represented in Figure 6 the lens $i$ causes it to appear as a curved surface with regard to the secondary object lenses $e$.

As a consequence strictly speaking the secondary images have not all their points exactly focussed on the sensitive plate. When a rigorous correction is desired the small imperfection can be effectively corrected by the application of plano-concave lenses $l$ (Figure 7) before the different images, such plano-concave lenses being so calculated that the images have all their points exactly focussed.

It may also be noted that the lens $i$ necessarily produces a deformation of the image (an aberration) by which the straight lines appear more curved the greater the distance from the central axis of the camera and that such a defect must necessarily be reproduced in the secondary images on the plane $g$. As, however, the secondary images after being photographed are projected through the same optical device such deformations are automatically corrected, and it must be said that such deformations are necessary in order that the projection gives correct and not deformed images.

In the foregoing description the camera has been considered as formed of three parts, $a$—$b$—$c$—$d$, $d$—$f$ and $e$—$f$—$g$—$h$, placed one behind the other, but it may also be considered as consisting of two parts, one entering into the other, i. e., the portion $a$—$b$—$g$—$h$ which does not differ in its structure from an ordinary photographic camera except in that its length is greater than the focal distances of the object lens and an internal unchangeable optical device or arrangement as $c$—$e$ in the type of apparatus illustrated in Figure 1 and $i$—$e$ in the type illustrated in Figures 6 and 7, by means of which, instead of having a single image, there is obtained a group of as many images as there are secondary object lenses. The apparatus may also be considered as a photographic camera supplied with a special object glass simple and multiple at the same time as $a$—$i$—$e$ (Figures 6 and 7) capable of giving place in its interior to a subdivision of the rays of light, which forms a plurality of distinct images instead of a single one; the group of images must then be considered as the sole, though complex, image given by the special simple and multiple object lens $a$—$i$—$e$ forming the object of this invention.

Figure 8:
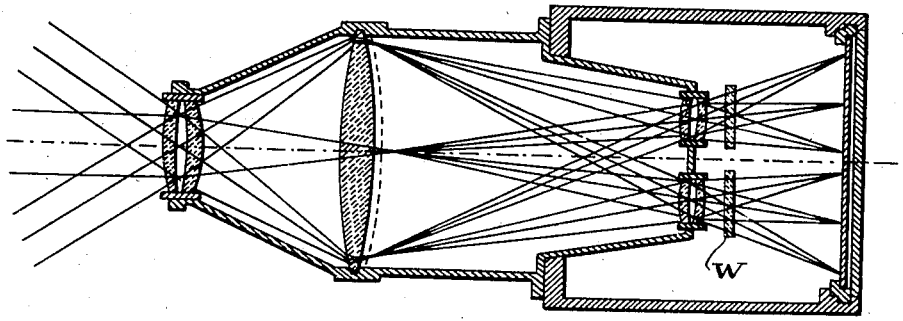
Figure 8 is a modification of the arrangements shown in Figure 7 and represents a different manner of connecting the optical elements of the system.

Figure 8 shows a construction in which the optical arrangement—$a$—$i$—$e$ is a special unit placed in the front of a photographic camera.

The following description explains how the improved apparatus has been designed and employed with the addition of another device for obtaining the photography in natural colors.

The secondary object lenses are supplied with colored screens or glasses the so-called filters $w$ as used in trichromy; for instance, if the secondary object lenses . . . are three (Figure 2) one can adopt either the elementary colors, yellow, red and blue, or the elementary colors green, orange-red and blue-purple; that is three colors so chosen that when combined white light is produced.

Figure 5:
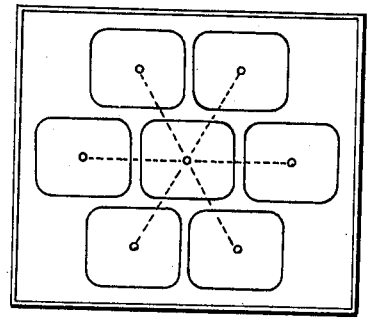

Nothing more need be said on the choice of the three colors and on the necessity of establishing them in such a way as to be always possible to reproduce them at all times and in all places, these things being well-known. Four or five colors could also be chosen, selecting them in the scale of the natural colors. Even seven colors could be taken, i. e., as many as the colors of the spectrum as illustrated in Figure 5.

There will thus be obtained at the same time and on a single plane as many equal images as there are object lenses, these images being differently colored.

The filters $w$ can also be placed before the various secondary images.

The idea of this device being a simple and multiple object glass that gives a single though complex image appears now so much more justified as by such a way of conceiving the apparatus, by the addition of colored screens, I construct an object glass capable of analyzing the colors each of the secondary images being the complement of all the others, so that they form properly speaking all one thing.

It has already been mentioned that the photographic plate $h$ (Figure 1) must be color sensitive, that is, panchromatic. These plates have a different degree of sensitivity for the different colors, and the makers give exact information as to the degree of sensitivity corresponding to each screen, so that by adjusting the opening of the diaphragm of each secondary object lens, and giving a correct exposure through the primary lenses $a$, the correct impression is given to all the secondary images. This may be arrived at even if the degree of sensitivity is unknown. A few trials made with the same machine in order to establish the relative diaphragm openings for the various colors will be sufficient when it is remembered that a white object must give black impressions of the same intensity all over the various images of the negative.

The description so far relates to the apparatus as a camera for photographing objects, and as such gives a black negative composed of a group of images, such images being different from one another according to the screens used.

From the negative plate is taken a positive on a glass, sometimes called a diapositive, following the ordinary methods of printing positives. This diapositive will contain a group of images arranged, for instance, as it appears in Figures 2, 3, 4, and 5. Obviously the image corresponding to the red screen will be transparent in the parts reproducing red objects, whilst the same objects will appear as black in the screens corresponding to the green, blue or other screens.

Having obtained the positive, the same camera as used for taking the photo may be used either as a sight projecting apparatus or as an apparatus for directly viewing the photos, as in a verascope or the like, in order to see the photographed objects in their natural colors.

It must be noted that the positive is black, both the positive and the negative being made and developed according to the ordinary processes.

In order to project the image of the photographed objects on to a screen, the positive is placed in a frame at $g$ (Figure 1), care being taken that the images are in the exact position as when the photo was taken. By lighting with a white light the positive, as in the ordinary system of projection, each secondary lens $e$ (Figure 1) will give a colored image on the ground glass $c$ and the various images all identical in their outline will superpose into a single image and reconstitute with their fusion all the gradations of colored light that were formed on the glass $c$ when the photo was taken. The image formed on the glass $c$ with its natural colors will be reproduced before the object lens $a$ in a position to be projected to a distance by the said object lens acting as a projecting lens. The device for moving lens $a$ in the portion $b$ of the camera will serve now to focus the image on the screen.

The same effect takes place if instead of a ground glass there is an optical converging arrangement as represented in Figures 6, 7 and 8; but the projection will be much finer because the ground glass absorbs and disperses a large quantity of light. It is important that in the arrangements according to the Figures 6, 7, 8 and to Figure 1 special attention must be paid to the uniform illumination of the images grouped in the diapositive. This may be obtained in various ways: that is, by means of an incandescent lamp, mercurial vapor or other source of illuminant. A special condenser and source of light may be arranged for each of the small images, using a multiple lamp with a group of small condensers, or even other systems can be employed, the most simple being the one represented in Figure 9.

Near the sliding frame $n$, where the diapositive $m$ is mounted, is placed a group of converging lenses $o$, which are properly cut in order that each of them covers one of the secondary images of the diapositive, and therefore placed near to one another as represented in Figure 9. The focal length of the lenses $o$ and the position of their centres are so regulated that each of them forms an image of the source of light, or a concentration of the luminous rays on the centre of the corresponding secondary object lens $e$. In such a way the condition is verified for obtaining a uniform illumination both for each elementary color and for the image which is projected on the screen.

It may be convenient to restrict the cone of light from the object lens, when an image is projected on to a relatively small screen placed at a relatively great distance. This is possible either by using a telescopic object glass instead of the front object glass $a$ or otherwise by substituting both the collective lens $i$ and the front object glass $a$ with optical systems of adequately increased focal lengths.

For using this apparatus for the direct observation of colored images as in a verascope or the like the positive must be placed in the frame used for the projection. It is not necessary to place near the frame the group of condensers $o$ represented in Figure 9, but should this group be applied, the effect will be better. An intense light is not required, a good illumination will be obtained by turning the apparatus towards the sky with or without the intermediary of a ground glass, or, even better, towards a white opal glass as in a stereoscope, verascope, or the like. The rays of light form a colored image either on the plate $c$ (Figure 1) or on the plane $j$ (Figure 6) or also on the curved surface $k$ (Figure 7). With the arrangement shown in Figure 1, the image formed at $c$ may be looked at with the object lens $a$ used as an eye glass; the same applies to the arrangement shown in Figures 6 and 7, but it will be necessary to exactly place at $j$ (Figure 6) a ground glass, or respectively at $k$ (Figure 7) a ground glass having the form of a meniscus of exact curvature and in its exact position. It will be noted that if the image was formed inside the lens, the ground glass could not be correctly positioned. As a peculiar case one may conceive that the image be formed on one of the faces of the lens $i$, in which case a separate observation lens would be required having a ground face.

Should the ground glasses not be used, the image formed at $j$ or $k$ would appear as red or green or blue, etc., depending whether the observer's eye was brought towards the one or the other side of the eye glass. The eye glass in fact appears as if it were supplied with a diaphragm having many holes, each supplied with a colored screen $w$. This fact leads to the consideration that during the operations of photographing or projecting the object lens *a* acts as if it had a diaphragm with many holes, each used for a different color, and that the colored screens *w* could be placed in this zone of the lens instead of at the secondary object lenses or before the photographic plate. The image seen through the object lens will appear (a) upside down and (b) laterally reversed. The first inconvenience is remedied either by capsizing the whole apparatus, or by turning the diapositive upside down and capsizing at the same time the plate on which the group of the secondary object lenses is placed, or by turning upside down the rigid portion *f—g—h* (Figure 1) of the apparatus which forms the small unchangeable device introduced into the principal part of the apparatus. The second of such methods should be preferred.

The second inconvenience is remedied by turning the positive round i. e., by allowing the fore face of such positive to become the face that in the projection is the rear face, or more exactly, should the diapositive consist of a prepared gelatinous glass and of a counter glass, when arranged for projection the glass must be turned inside and the counterglass outside beside having the figures standing upright, whilst when arranged for the observation, the counterglass must be turned inside beside having the figures turned upside down.

The reversion of the positive obtained by its rotation round a vertical axis is sufficient to obtain the desired result provided the object lenses have a symmetrical diaposition with regard to a vertical axis as shown in Figures 2 to 5, and moreover that they are equal and interchangeable with one another and that the filters are equally inverted, so that to each secondary image corresponds its own appropriate colored filter. All this presents no difficulty. It may be added that the inventor has made a unique body of the whole of the filters, which can take either an upright and a reversed position, but other systems may be applied so that the group of the filters in each of which one color can be repeated more than once can be worked from outside the camera in order to transmit to it such movements as to present the proper colors according to whether the apparatus is to be used for direct vision or for projection. It is also convenient that the movement of the diaphragms of the secondary object lenses should be operated from outside the camera by mechanical means as levers or transmission rods easily conceivable.

In the same manner that the openings require adjustment for the different colors during photographing they require adjustment for the projection and the direct vision. Corrections for enabling white objects to appear always white are possible also when the artificial light for projection is not exactly white, and reciprocally, and pictorial effects of light, as for instance the blue of a moonlight, the red of a sunset in flames, can be obtained by simply varying the opening of the diaphragms.

If it is preferred to have equal to one another the openings of the diaphragms, lightly darkened transparent glasses could be added near the secondary object lenses in order to adequately moderate the intensity of light of the various colors.

When considering colored borders of the outlines of objects represented may appear both in the projection and in the direct vision, if in taking the photo there were comprised in the field of sight objects standing very near the apparatus together with others standing far away from it. Such errors arising from parallax are avoided if in taking the photo the same plane or curved ground glass *j* (Figure 6) or *k* (Figure 7) is used as described as serving for the direct vision of the image. By keeping in position the said ground glass, the objects which are not exactly focussed give on each ground glass some more or less marked shades, but the secondary images at *g* will faithfully take and fix such shades which are afterwards reproduced by the positive such as they were at the instant of the photography. It is true that in using such system the duration of operation must be three or four times longer than when the ground glass is not in place; but as a compensation one may obtain some very beautiful effects, as for instance when the portrait of a person placed near the camera is taken on the background of a distant landscape.

It is well to note that this apparatus is very useful in many ways for the production of trichromies. One of the most simple ways is as follows: the diapositive is placed at the plane *m* (Figure 9) and the object lens *a* is racked into the position where it was at the moment of photographing, then a common photographic camera is placed with the object lens before the lens *a* so that it will receive the rays of light in the same way as it would have received them from the real objects, receiving as many negative impressions as there are secondary images, all these negatives being equal to one another as regards their outline, but corresponding to the different colors without having recourse to colored screens.

By means of such negatives the trichromies or the polychromies are made with the well known processes, including the photographic impression obtained with the use of bichromatic pigments.

The figures illustrating the present specification are quite diagrammatic, and it must be understood that the construction of the device can be of any desired type provided that the characteristics specified above are preserved. As, for instance, the fore part *a—d* of the camera (Figure 1) can be made capable of being shortened as a kodak, the middle part *d—f* being made as a bellows with pivoted hooking rods, and the rear part *f—h* also reducible but preferably rigid and invariable so as to avoid any displacement of the secondary object lenses with regard to the chassis that gives the exact position firstly to the sensitive plate and then to the diapositive.

When taking the photos, the operation of focussing should normally be made by observing the final image, i. e., the group of secondary images by drawing forward or backward the front object lens; but as owing to the special structure of the apparatus, the secondary images are focussed only when the principal image is formed in its exact fixed position *c* in the case of Figure 1, *j* or *k* in the cases of Figures 6 or 7. It may be deemed preferable for sake of a greater exactness, to focus the image by directly observing the said primary image on the ground glass expressly kept in place. For this purpose one may have recourse to an arrangement of the kind represented in Figure 10 in which an opening *q* in the top of the camera, may be shut by means of a hinged lid, and a mirror *r* inclined of 45 degrees is placed inside said camera, such mirror being operated from outside in order to pass from the position of working, as represented in dotted lines to the position of rest. The same movement may be automatically operated by connecting the mirror by means of small pivoted rods to the lid, so that the mirror stands up when said lid is lifted up.

The ground meniscus glass placed at *k* (Figure 7) can be connected with an outside movement in order to be moved from the working to the resting position, such ground glass having always to remain in the position of working during the direct vision, sometimes during the operation of photographing and sometimes in the position of focussing, whilst it must be always at rest during the projection and generally also when photographing. Obviously a prism may be employed instead of a mirror at 45 degrees. In some cases the primary image may be focussed without a ground glass by using only a focussing lens arranged by the operator to suit his own sight as usual.

Before mentioning how the apparatus can be applied to the construction of stereoscopic apparatus, it should be pointed out that for the direct vision instead of a diapositive a positive impressed in black on a white card board, can be used same as in the common stereoscopic cameras where impressions on card boards are often used instead of diapositives. The impression can in this case be lighted either by artificial light or by natural direct or reflected light as used in the ordinary steroscopes, the result being that a collection of prints can be obtained which when viewed through the present improved camera appear with their natural colors.

A stereoscopic apparatus according to the present improvement can be had by coupling in one camera two of the improved cameras of the type specified above, the constructive dispositions being those used in the photographic stereoscopic apparatus now in use. For instance it is possible and advantageous that the two groups of optical arrangements be adjustable and movable one with regard to the other, so as to change their distance at will. It is equally convenient that the two front object lenses which during the direct vision of the images are used as eye lenses may be displaceable with regard to one another, the former displacement being useful when the photo is taken in order to obtain a more or less marked relief, whilst in the arrangement for the direct vision such distance must always be brought to the same constant value, i. e., the normal distance between the two eyes in order to fix at a constant invariable value the distance between the centres of the two groups of images of the diapositives. The observer must then regulate the distance between the two eye lenses, that is to say, between the two front object lenses of the apparatus, in order to cause it to suit his occular interval.

Let us suppose now that a unique negative be taken, that is to say that both the right and left hand images are taken on the same plate; if we take a diapositive from this plate and place it in such way that the image corresponds exactly to the one that existed at the moment the photo was taken, the vision would then be defective and false:

(*a*) Because the right eye would see what the left one should see, and reciprocally, (*b*) Because the images would be seen turned upside down, (*c*) Because the images would be seen reversed as when reflected in a mirror.

The correction of these defects is however more easy than it may appear at first, and even more simple than for the case of the non-stereoscopic apparatus, provided that the two following conditions always easily realized are satisfied:

First that the secondary object lenses are all equal to one another;

Second that the object lenses of one side are placed at the vertexes of a geometrical figure symmetrical to that of the other side, but turned upside down.

Figure 11 diagrammatically represents a stereoscopic diapositive and gives an example of one of the arrangements that can be adopted with reference to the case in which the chosen system is the one of the three colors. This arrangement supposes that the object lenses of one side are arranged on the vertexes of an isosceles triangle symmetric with regard to a vertical axis, but it must be noted that contrarily to what has been said with reference to Figures 2, 3, 4, 5, in the stereoscopic apparatus such a symmetry is not more necessary whilst it is necessary that between the figures of the right and left side exists the relation which has been referred to.

In taking the diapositive care must be had to transpose the groups of images by placing on the right the left hand group and reciprocally, as it is done in the ordinary stereoscopic photography, and on placing the diapositive in its place, this must be turned upside down. By so doing the object lenses will exactly be centered for the images that stand opposite, and all the errors to which it has been referred will be corrected. In fact, owing to the transposition made while printing the diapositive, the right eye will now see the right side image and reciprocally whilst on account of the reversion of the diapositive the objects appear standing upright and in their natural position as has been explained with reference to the simple improved camera.

It must be noted here that if the same colors are chosen both for the right and the left side the colored screens must undergo no change from the taking of the photo to the position of direct vision. For instance, in Figure 11 it will be seen that after the transposition and the reversion the left side image $s$ will pass to the position $s$ of the right side, and the same thing will happen for the images $t$ and $u$, so that if to each of these letters corresponds a color each of the six colored glasses can remain in its place.

A finer and more complete effect is attained when two different systems of colors are chosen for the right and for the left side, each one being however, complete for giving on its own account the complete scale of colors as are in the nature, the white color included.

It is obvious that when the group of colors chosen for the right side is different from the group selected for the left side transposition and a reversion of the system of filters must be operated when passing from the position for photographing to the position for the direct vision.

The application of this invention to cinematography will now be referred to. For this purpose a complex object lens of the type as represented in Figure 8 must be employed in a cinematographic camera or in a cinematographic projector instead of the ordinary object lens. Of course, the optical system is conveniently proportioned to the size and distance of the screen, as it has been mentioned in the specification in a general way. For instance, it is possible to substitute the front object lens $a$ with the ordinary object lens of the projector as before described.

The film must contain in its width a group of images instead of a single image. The negative sensitive film must be panchromatic, the positive may be of the ordinary kind.

Having now particularly described and ascertained the nature of my said invention and in what manner the same is to be performed, I declare that what I claim is:—

1. In an optical system for taking or reproducing photographic views of still or moving objects in their natural colors comprising in combination a casing, primary object lens mounted in the front part of the casing, means at the rear end of the casing for mounting a photographic plate, a plurality of secondary object lenses in the casing between the primary object lens and the plate, different colored screens in operative relation with each of the secondary object lenses and corresponding in color to the colors of the main object, a collective lens arranged in the casing between the primary and secondary lenses near the plane of formation of the the primary image for deflecting the rays of light coming from the object lens toward the secondary lenses so that the rays will ultimately be impressed on the photographic plate in the form of a plurality of separate images corresponding to the number of secondary lenses, and the secondary lenses being arranged inside the luminous cone formed by the collective lens.

2. An arrangement as claimed in claim 1, wherein a plurality of plano-concave lenses are arranged adjacent the photographic plate for ensuring of the correct focusing of the images thereon, substantially as and for the purposes set forth.

In testimony whereof I have signed my name to this specification.

GIOACCHINO RUSSO.